United States Patent
Fukano et al.

(10) Patent No.: US 6,612,759 B2
(45) Date of Patent: Sep. 2, 2003

(54) PRINTER, PRINTER CONTROL METHOD, AND MEDIUM FOR STORING THE CONTROL METHOD

(75) Inventors: Kazuko Fukano, Suwa (JP); Tadashi Inakoshi, Suwa (JP); Toshiaki Koike, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/733,177

(22) Filed: Dec. 7, 2000

(65) Prior Publication Data

US 2001/0004241 A1 Jun. 21, 2001

(30) Foreign Application Priority Data

Dec. 7, 1999 (JP) ............................................. 11-347653

(51) Int. Cl.$^7$ .................................................. B41J 3/42
(52) U.S. Cl. .............................. 400/74; 400/61; 400/70; 400/76
(58) Field of Search .............................. 400/74, 76, 70, 400/61

(56) References Cited

U.S. PATENT DOCUMENTS

| 4,944,031 A | 7/1990 | Yoshino et al. |
| 5,444,524 A | 8/1995 | Lee |

FOREIGN PATENT DOCUMENTS

| EP | 0 916 494 | 5/1999 |
| JP | 60-46284 | 3/1985 |
| JP | 61-130078 | 6/1986 |
| JP | 61-276017 | 12/1986 |
| JP | 63-132078 | 6/1988 |
| JP | 63-242676 | 10/1988 |
| JP | 1-246568 | 10/1989 |
| JP | 402150913 A | * 6/1990 |
| JP | 2-301818 | 12/1990 |
| JP | 3-293855 | 12/1991 |
| JP | 4-133784 | 5/1992 |
| JP | 4-272887 | 9/1992 |
| JP | 405181621 A | * 7/1993 |
| JP | 5-301425 | 11/1993 |
| JP | 5-345462 | 12/1993 |
| JP | 6-191079 | 7/1994 |
| JP | 7-149027 | 6/1995 |
| JP | 7-156461 | 6/1995 |
| JP | 8-317097 | 11/1996 |
| JP | 9-267953 | 10/1997 |
| JP | 411102281 A | * 4/1999 |
| JP | 11-203098 | 7/1999 |
| JP | 11-289414 | 10/1999 |
| JP | 11-334179 | 12/1999 |
| JP | 11-348259 | 12/1999 |

* cited by examiner

Primary Examiner—Charles H. Nolan, Jr.

(57) ABSTRACT

A printer for reporting a printer error state to a user using sound, a control method for the printer, and a data storage medium storing the control method as a computer-readable program use a printing unit (print head 208) that prints text or graphics, a detector (cover open sensor 251, no-paper sensor 252, temperature sensor 253) that detects specific printer error states, and settings memory (RAM 204) that stores a setting determining whether errors are reported using sound. A sound generator (buzzer 231) emits sound when a particular error state is detected by the detector and a setting instructing acoustic error state reports is stored in the settings memory (RAM 204).

20 Claims, 6 Drawing Sheets

| RAM 204 | | 1 COVER OPEN | 2 NO PAPER, PRINTING STOPPED | 3 RECOVERABLE ERROR OCCURRED | 4 NON-RECOVERABLE ERROR OCCURRED |
|---|---|---|---|---|---|
| 221 RECEIVE BUFFER AREA | | | | | |
| LINE BUFFER | ENABLE REPORTING FLAG | 1 | 1 | 1 | 1 |
| 222 | REPORT COMPLETED FLAG | 0 | 0 | 0 | 0 |
| | SOUND TYPE | 8 | 5 | 4 | 2 |
| | NUMBER OF EMISSIONS | 10 | 10 | 10 | 10 |
| | EMISSION INTERVAL | 5 | 5 | 5 | 5 |
| | PRIORITY LEVEL | 255 | 127 | 63 | 1 |

271

PRINTER, PRINTER CONTROL METHOD, AND MEDIUM FOR STORING THE CONTROL METHOD

BACKGROUND OF THE INVENTION

1. Field of the Invention

The present invention relates to a printer, a control method for the printer, and a data storage medium storing a computer-executable program implementing the steps of the control method. More particularly, the present invention relates to a technique for an acoustic (aural) display of error states occurring in the printer.

2. Description of the Related Art

Printers for printing text and images on paper or other printing medium according to control commands, print data from a host device are well known and widely used. The host device in such systems often sends data (control commands and print data) to the printer from some remote location by way of a communications link.

Furthermore, when an error, such as the paper running out, occurs during printer operation, the printer typically stops printing, and notifies the user that an error has occurred by means of an optical (visual) display. The type of error may be reported by lighting or flashing an LED (Light-Emitting Diode) on a display or operating panel of the printer.

Japanese Unexamined Patent Application Publication (kokai) 63-242676, for example, teaches a printer that can report a variety of errors visually using a single indicator lamp by selecting the flashing cycle of the indicator lamp according to the type of error. Japanese Unexamined Patent Application Publication (kokai) 63-242676 also discloses reporting various errors acoustically by varying the sound pattern of a buzzer used in place of indicator lamp.

Japanese Unexamined Patent Application Publication (kokai) 7-156461 discloses a printer shared by multiple host devices and capable of issuing sound to notify print start, print end and alarms. The sound differs depending on which of the host devices instructed the print job involved.

Another printer using visual error reports is known (Japanese Unexamined Patent Application Publication (kokai) 2-301818) that assigns priorities to possible errors and, when plural errors occur simultaneously, reports the error with the highest priority. As the reported error is resolved, that one with the next highest priority is reported, if any, and so forth.

A problem common to conventional printers that notify the user of errors by optical means is that users may not notice a visual error report, be it because the user is working at a location separated from the printer or the printer is installed at a place, such as under a desk, on top of a shelf etc., where it is difficult for the user to see the operating panel on which errors are displayed. Furthermore, it is difficult to identify the type of error using only flashing LEDs.

On the other hand, if a conventional printer that uses a buzzer to report errors acoustically is used in a place with loud noise or a high ambient sound level, it can be difficult to hear the buzzer and recognize the error report. If multiple printers that report errors acoustically are used in proximity to each other, it can be difficult to determine which printer is reporting the error.

Furthermore, printers that are used at cash registers or other POS (Point-Of-Sale) terminal are typically housed inside the register or POS terminal, and some such printers are designed to sound a buzzer in response to command sent from the host. However, when an error occurs the printer cannot sound the buzzer in response to command because command processing is interrupted.

OBJECTS OF THE INVENTION

Therefore, it is an object of the present invention to overcome the aforementioned problem of the prior art, and to provide a printer capable of reporting an error status to a user by means of sound, to provide a method of controlling such printer, and to provide a data storage medium storing a computer-readable program embodying this control method.

SUMMARY OF THE INVENTION

To achieve the above object, the present invention provides a printer adapted to be connected to a host device and to operate according to data received from the host device. The invention is characterized by a printing unit; an audio device for producing sound; a detector for detecting whether the printer is in an error state; a memory unit for storing a setting indicative of whether the printer error state is to be reported by means of sound in response to a predetermined first command from the host device; and a controller for driving the audio device to emit sound when the detector detects the particular error state and the memory unit stores a setting declaring audible error state reporting. As a result, this printer can audibly report printer error states to a user.

Furthermore, the memory unit preferably stores sound type information corresponding to a particular error state type in response to the first command, and the controller drives the audio device in accordance with the sound type information stored in the memory unit corresponding to the error state detected by the detector. It is therefore possible for the user to determine the type of error state that has occurred, or more specifically can determine from the emitted sound what type of error state has occurred.

Yet further preferably, the memory unit stores a sound emission count for sound corresponding to a particular error state type in response to the first command, and the controller drives the audio device in accordance with the sound emission count stored in the memory unit with correlation to the error state detected by the detector. It is therefore possible to automatically stop the sound whereby an error state is reported.

Yet further preferably, the memory unit stores a sound emission time for sound corresponding to a particular error state type in response to the first command, and the controller drives the audio device in accordance with the sound emission time stored in the memory unit with correlation to the error state detected by the detector. It is therefore possible to automatically stop the sound whereby an error state is reported.

Yet further preferably, the memory unit stores a priority level for reporting a particular error state type in response to the first command, and the controller, when a plurality of error states is detected by the detector, reports the error state with the highest priority level in accordance with the priority level information stored in the memory unit. It is therefore possible in this case to report error states of the highest priority first when plural errors occur at the same time.

Yet further preferably, the memory unit stores a sound volume for sound corresponding to a particular error state type in response to the first command, and the controller drives the audio device in accordance with the sound volume stored in the memory unit with correlation to the error state detected by the detector. It is therefore possible to automatically stop the sound whereby an error state is reported.

Yet further preferably, the controller drives the audio device in response to a predetermined second command received from the host device. If this command is sent following print data, the end of printing can be announced.

Yet further preferably, the controller stops driving the audio device in response to a predetermined third command received from the host device. It is thus possible to stop an audible report as desired by sending an appropriate command from the host device. It is also possible to reliably ensure that the user notices the error state.

Yet further preferably, the memory unit comprises a nonvolatile memory.

The invention can also be expressed as a control method for a printer. The effects and benefits achieved by this control method are the same as those of the printer described above.

Furthermore, a printer in accordance with the present invention preferably includes a program-controlled microprocessor for controlling the printer. In such case, the method according to the invention can be achieved by running a corresponding program carried on a data storage medium, such as a compact disc, a floppy disk, a hard disk, a magneto-optical disk, a digital video disk, magnetic tape, or semiconductor memory. The program can be distributed, sold separate from the printer of the present invention, and can be updated from a host device independently.

Other objects and attainments together with a fuller understanding of the invention will become apparent and appreciated by referring to the following description and claims taken in conjunction with the accompanying drawings.

DESCRIPTION OF THE PREFERRED EMBODIMENTS

A preferred embodiment of the present invention is described below with reference to the accompanying figures. It should be noted that the following embodiment is descriptive of the present invention only and shall not limit the scope of the accompanying claims. Furthermore, it will be obvious to one with ordinary skill in the related art that various alternative embodiments within the scope of the accompanying claims will be possible by varying some or all of the described elements, and that all such variations are included within the scope of the accompanying claims.

Figure 1:
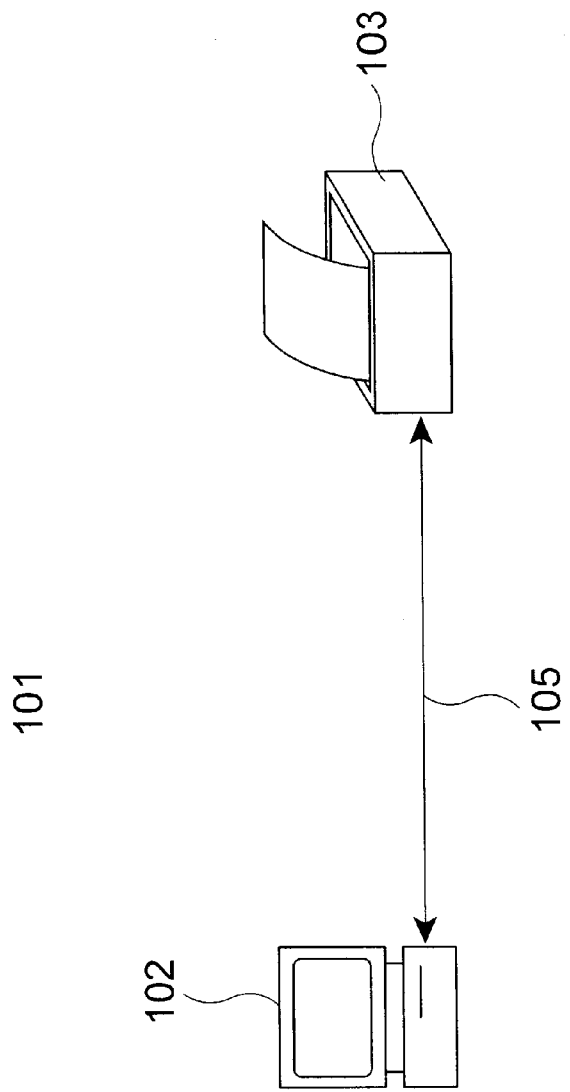
FIG. 1 is a schematic diagram showing the configuration of a printing system containing a printer according to an embodiment of the present invention.

As shown in FIG. 1, a printing system 101 includes a host device 102 (simply referred to as "host" below) and a printing apparatus 103 (simply referred to as "printer" below); the host and the printer are interconnected by a communication link 105.

When host 102 sends data to printer 103 by way of communication link 105, the printer 103 receives and interprets the data, and then runs a process corresponding to the interpreted data.

Command System

A printer command system is typically used to correlate a respective instruction to a particular process. In the command system used in this exemplary embodiment each command is a byte string of one or more whole bytes. The commands are expressed in this specification using hexadecimal notation, which is indicated by the prefix 0x. Exemplary commands that will be used below to explain an embodiment of the present invention are the following:

Print data, 0x20–0x7e. Each byte is interpreted as a specific ASCII code, causing the corresponding character to be printed.

Carriage return command, 0x0a. Prints and advances the printing medium by one line.

Acoustic report command, 0x1b 0x28 0x41 pL pH fn n c t (fn=1). Starts driving a sound generator such as a buzzer.

Acoustic report setting command, 0x1b 0x28 0x41 pL pH fn a b n c t (fn=2). Sets the sound to be emitted when something that causes the printer to go offline happens, that is, when an error occurs.

Stop sound command, 0x10 0x05 m. The host 102 sends this command telling the printer to stop sounding the sound generator.

Furthermore, fn, n, c, t, a, and b are each a one byte command parameter, and pL and pH are bytes (pL+pH*256) indicating the number of command parameters that follow.

Command parameter fn specifies a function code.

Command parameter n specifies the type of sound to be emitted.

Command parameter c specifies the emission number, that is, the number of times the sound is to be emitted. Note that for the acoustic report setting command, setting parameter c to 0 (c=0) cancels acoustic output (the buzzer does not sound) while setting c to 255 (c=255) causes continuous output (the buzzer sounds continuously). These parameter settings can therefore be used to prevent the buzzer from sounding even if an error occurs, or to cause the buzzer to sound continuously when an error occurs.

Command parameter t sets the interval between sound emissions (the emission interval). In this exemplary embodiment, the actual interval is set to (t*100 ms).

Command parameter a sets the error type, i.e., it selects one of the records of table 271. In this exemplary embodiment, there are four types of errors that can cause the printer to go offline:

1. the printer cover is open;
2. there is no paper so that printing stops or cannot start;
3. a recoverable error other than error type 1. or 2. occurred;
4. a non-recoverable error occurred.

A recoverable error refers to operating errors resulting primarily from user error or operating conditions. Normal operation can be restored when a recoverable error occurs by, for example, reinitializing the printer. Included in recoverable errors are paper loading errors, paper jam errors, and high print head temperature errors.

A non-recoverable error is primarily a hardware-related error involving the printer itself or its power supply. These are typically considered a malfunction of the printer or printing system. Included in non-recoverable errors are supply voltage errors, CPU (central processing unit) run errors, drive circuit errors, and memory errors.

Command parameter b specifies a reporting priority controlling which error is reported first when multiple offline errors occur simultaneously. If parameter b has a range from 1 to 255, a value of 1 could indicate highest priority and a value of 255 lowest priority, for example.

The acoustic report setting command can be used to override the default settings of the acoustic report information in table 271. If printer 103 detects an acoustic report setting command, fields of that record in table 271 that are specified by parameter a are set in accordance with the parameters of the command, i.e., parameter n is written into the Sound Type field, parameter c is written into the Number of Emissions field, parameter t is written into the Emission Interval field, and parameter b is written into the Priority Level field.

In the stop sound command, if command parameter m=1, the printer restarts printing from the beginning of the line where an error occurred, after recovering from the error, if command parameter m=2, the printer recovers from an error after clearing the receive and print buffers. This is a real-time command that can be processed before or instead of being stored in receive buffer even when the printer is offline. Real-time commands are thus of high urgency, and are processed with priority over other commands and print data. By means of the acoustic report command, printer 103 can be made to emit the sound determined by parameter n at the interval determined by parameter t for c times. For example, if this command is sent following print data, the end of printing can be announced by sounding the buzzer. It should be noted that if this command is processed while the buzzer is already sounding, the current buzzer sounding process is interrupted and the new buzzer sounding process starts. Sounding the buzzer in response to an acoustic report command can be ended by any of the following processes. That is:

conclusion of the number specified by parameter c;
an error occurs;
a stop sound command is executed;
power to the printer is turned off or a hardware reset occurs.

The printer 103 can also be set using parameters a and n of the audible report setting command to emit a sound corresponding to the error whenever an error occurs.

Note further that when an error occurs while another error is already being processed, the sound type is changed if the priority of the new error is higher than that of the error being processed. If the priority of the new error is the same or lower than that of the error being processed, the buzzer sounding process currently in progress continues. Sounding the buzzer as an error report setting command terminates with any of the following processes. That is:

conclusion of the number specified by parameter c;
an error is cancelled (resolved);
a stop sound command is executed;
power to the printer is turned off or a hardware reset occurs.

Other commands to add further sound-related functions could be added to the ones noted above by means of the function code fn and relevant parameters. For example, a sound registration command could be added for registering different sounds by linking a registration number with a sound pattern specifying a sequence of tones each determined by pitch and sound duration, i.e., a melody. In this case, parameter n of the acoustic report setting command would specify a registration number. Such a command would enable a user to register a desired melody and use that melody for reporting by the printer.

A parameter for specifying volume can also be provided. This enables the user to set the sound volume according to the conditions of the printer installation. Furthermore, a particular emission pattern may be hard to discern under certain conditions, but could be made easier to distinguish by setting the volume for that pattern louder than for other patterns.

Printer Configuration

Figure 2:
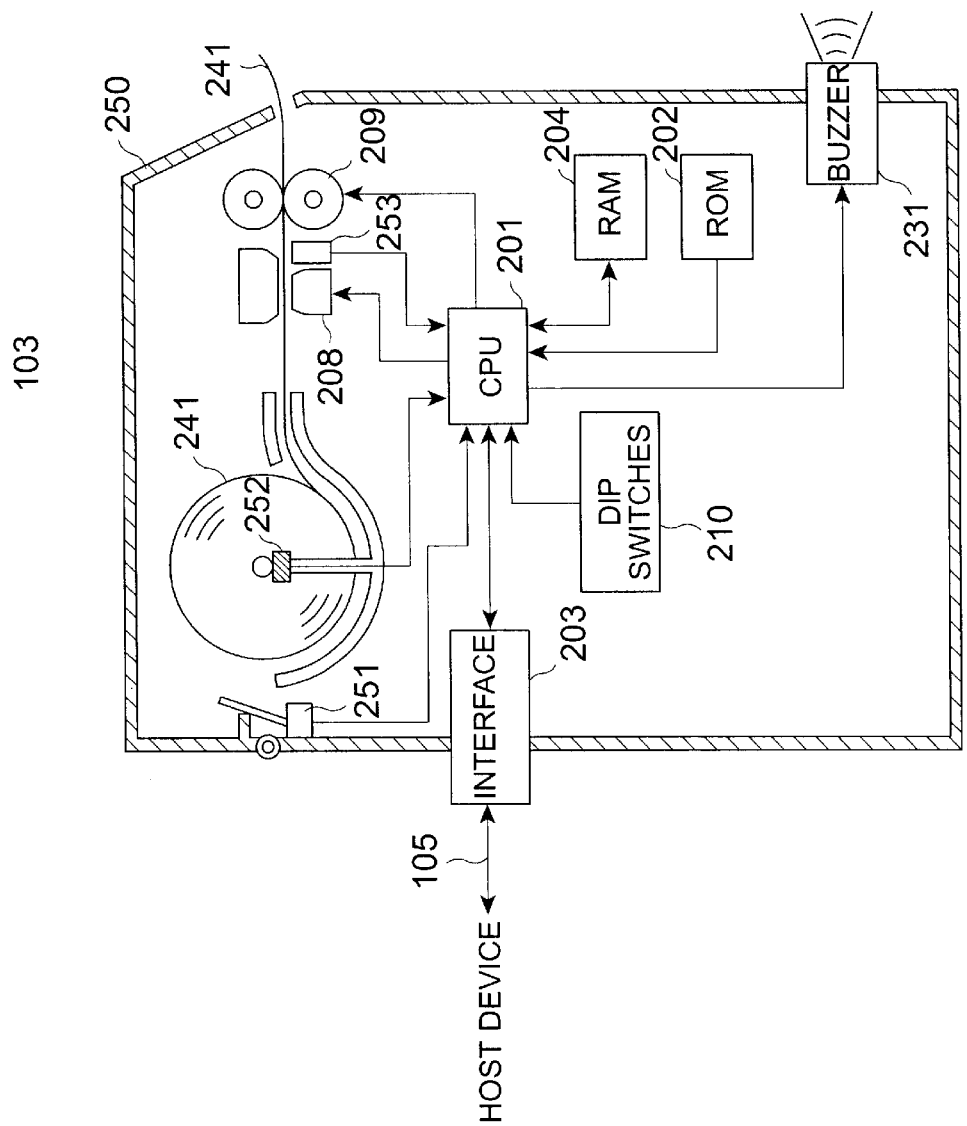
FIG. 2 is a schematic diagram showing the basic configuration of a printer in the system shown in FIG. 1.
Figure 3:
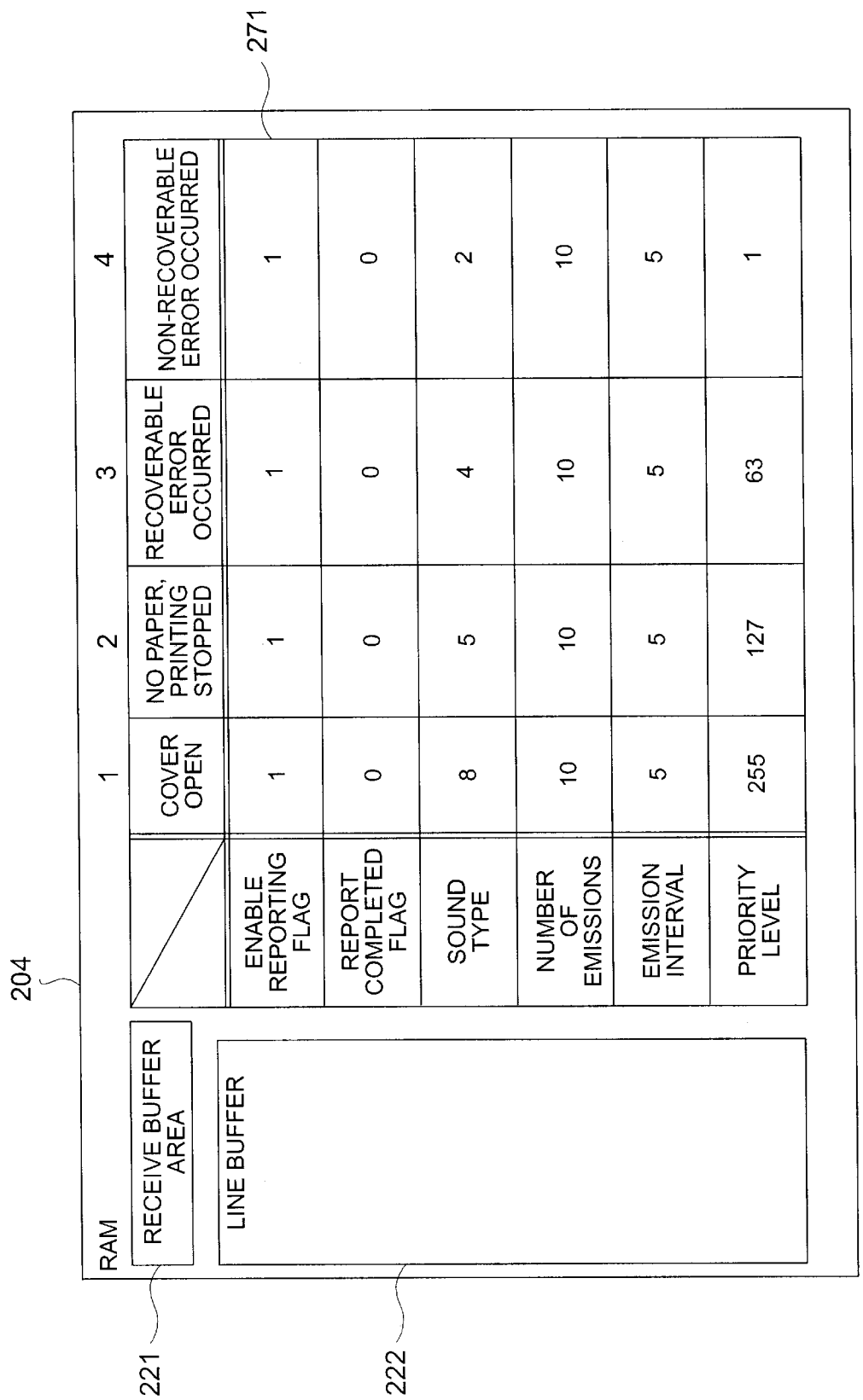
FIG. 3 is a schematic diagram showing the buffer areas reserved in RAM in a printer according to an embodiment of the present invention.

FIG. 2 shows the configuration of an embodiment of the printer 103 according to the present invention. FIG. 3 shows some of the buffer areas reserved in the RAM (Random Access Memory) of printer 103.

CPU 201 controls various parts of printer 103 according to a program stored in ROM 202. CPU 201 reads and then runs the program from ROM 202 when power to printer 103 is turned on. CPU 201 also initializes various parts of the printer and printer operation according to the settings of DIP switches 210. It should be noted that ROM 202 also stores a font definition for at least one text font.

The printer 103 communicates with host 102 by way of communication link 105 and interface 203. When data sent from the host is received, interface 203 issues a receive interrupt to CPU 201, and CPU 201 starts a receive interrupt process.

In the receive interrupt process, the received data is stored sequentially in a receive buffer 221 (a certain area in RAM 204 as shown in FIG. 3). If the received data is a real-time command, the corresponding process is immediately run. Control then returns from the real-time command process to the normal control process.

In the normal control process, CPU 201 sequentially reads and interprets data stored in receive buffer 221 to detect a command or print data contained in the buffered data, and then runs a process corresponding to the detected data. The processes include processes such as for the commands described above. Real-time commands, however, are processed in the receive interrupt process, and are therefore skipped when encountered in the normal control process.

When the received data is text or image print data, text font information for the text or a bit image of the image is generated in a line buffer 222 (print buffer, also a certain area in RAM 204). CPU 201 drives print head 208 to print the print image in line buffer 222 in line units on paper 241. It should be noted that while roll paper is used for paper 241, that is, the printing medium, in this exemplary embodiment, the kind of printing medium is not critical for the present invention and cut-sheet forms, continuous forms, or other type of printing medium could be used as well. When printing the one line is completed, transport roller 209 is driven to advance the paper 241.

Cover open sensor 251 for detecting if the printer cover 250 is open or closed, no-paper sensor 252 for detecting the presence/absence of paper 241, and temperature sensor 253 for detecting the temperature of print head 208, detect errors, i.e. causes for the printer to go offline. When one of these errors occurs, an offline interrupt is asserted to CPU 201 in this exemplary embodiment. Alternatively, configurations in which the CPU 201 polls the status of these sensors to check for the presence of any error are also within the scope of the present invention. Sensors 251, 252 and 253 should be understood to be examples only, i.e., other or additional sensors could be employed to detect errors.

When some type of error occurs, buzzer 231 emits a sound to notify the user. It should be noted that a sound generator other than a buzzer, such as a melody IC or voice generator plus speaker, or any other sound source could be used as well.

An error response table 271 is stored in RAM 204. This error response table 271 includes for each of the above-noted error types 1 to 4, a respective record of acoustic report information; each record contains the following fields (elements) in this embodiment:

Report enable flag: a flag that indicates whether the printer is to issue an acoustic report when the respective error type occurs. The flag is set to 1 to report, or 0 to not report.

Report completed flag: a flag that indicates whether an acoustic report was already issued for that error type. If the flag is set to 1, reporting is finished; if 0, the error has not been reported.

Sound type: an identifier that designates the type of sound to be used to report this error type.

Number of emissions: a value that indicates the number of times the sound, if any, is to be emitted.

Emission interval: a value that indicates the interval between successive sound emissions, if the number of emissions is greater than 1.

Priority level: a value that sets the report priority level for the respective error type. The lower the value, the higher the priority.

It is to be noted that the acoustic report information need not necessarily include all of the above fields and any sub-combination of the fields or additional fields (for instance, a field for setting the sound volume) would be possible.

When the power to the printer 103 is turned on, the report enable flag is set to 0 for all error types, that is, the printer is set to not issue any acoustic reports whatever error occurs. Note that the default settings of the acoustic report information in the error response table 271 can preferably be changed, for instance, by a corresponding setting of DIP switches 210. In such configuration the CPU 201 reads the settings of the DIP switches 210 when the power is turned on and during the initialization process, and sets the default settings in the error response table 271 accordingly. Alternatively, the error response table 271 can be stored in flash memory or other nonvolatile storage device. In this case the settings could be changed by exchanging the storage device holding the table. As described above, it is particularly preferable to arrange for changing the default settings of the acoustic report information by means of one or more control commands from the host. This may be possible instead of or in addition to changing means like DIP switches.

Normal Control Process

Figure 4:
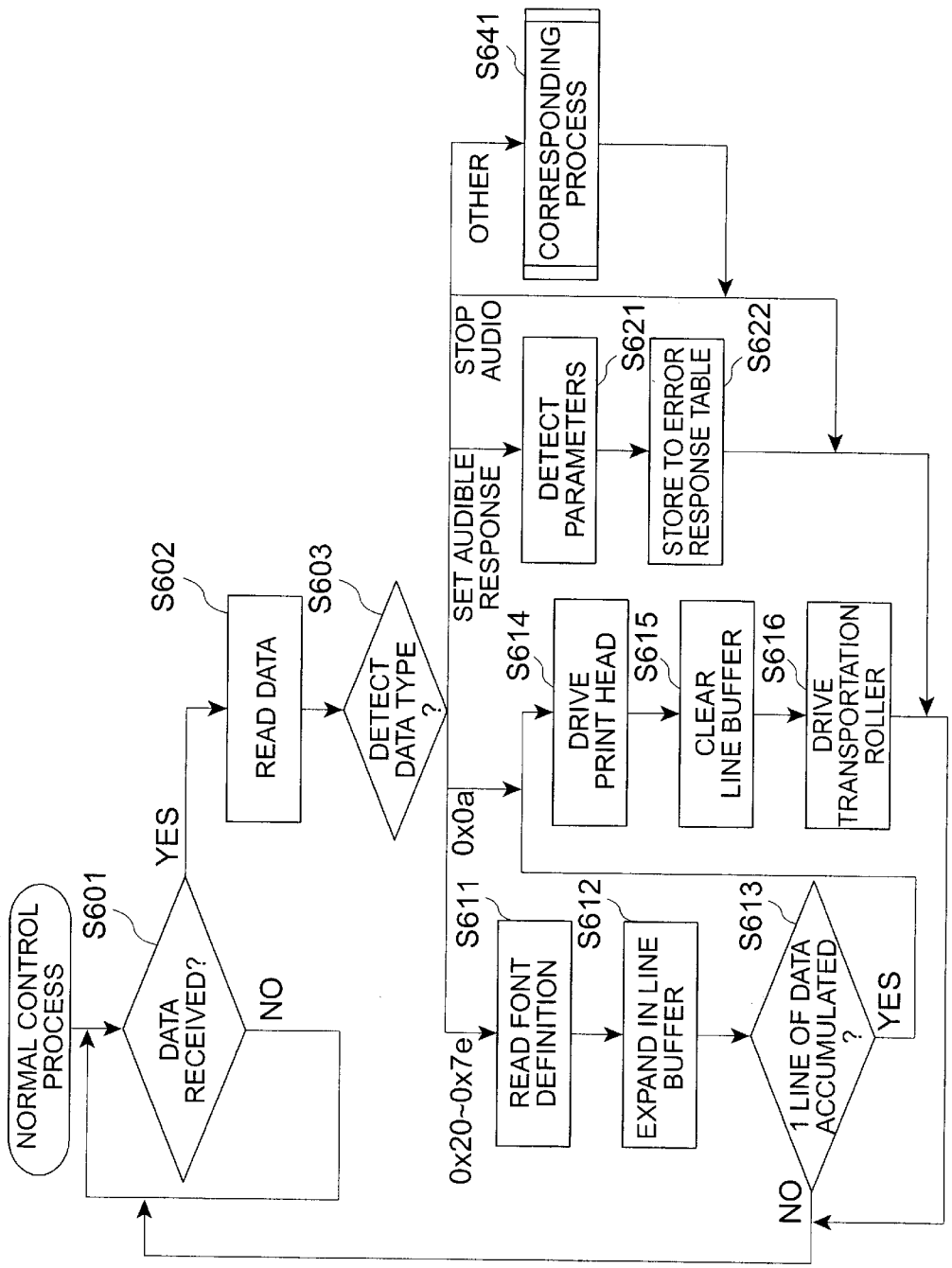
FIG. 4 is a flow chart of the normal control process run by a printer according to an embodiment of the present invention.

FIG. 4 is a flow chart of the normal control process run by a printer according to the present invention. CPU 201 first detects whether data has been received from the host 102, that is, whether data are stored in receive buffer 221 (S601). If receive buffer 221 is empty (S601 returns No), the procedure loops back to S601, and CPU 201 waits until interface 203 receives data from host 102, sends a receive interrupt to CPU 201, and data is stored in receive buffer 221. CPU 201 can perform other processes while waiting for data to be received.

If data is stored in receive buffer 221 (S601 returns Yes), CPU 201 reads the data from receive buffer 221 (S602). The receive buffer 221 is typically a ring buffer or queue, and the read data is thus deleted from receive buffer 221.

CPU 201 then detects the type of the data read (S603). If the data is print data (S603 detects 0x20 to 0x7e in this embodiment), the font definitions corresponding to the ASCII codes of the print data are read from ROM 202 (S611), and a bit image of the font definition is generated in line buffer 222 (S612).

CPU 201 detects if the data representing one line of a print image has been written into line buffer 222 (S613). If not (S613 returns No), the procedure loops back to S601. If step S613 returns Yes, CPU 201 drives print head 208 according to the print image to print the text or image (S614), and clears line buffer 222 (S615). CPU 201 also drives transport roller 209 to advance the paper one line (S616), and then returns to S601.

If step S613 returns No (the line buffer 222 is not full) but a carriage return command is detected (S603 detects 0x0a), CPU 201 knows that the end of the print line written into line buffer 222 has been reached, and therefore skips to step S614 to drive print head 208 and transport roller 209 to print that line (S614), clear the line buffer 222 (S615), advance the paper (S616), and then return to step S601.

If step S603 detects an acoustic report setting command in the data, CPU 201 detects parameters a, b, n, c, and t (S621), and stores the parameter settings in the corresponding fields of the record specified by parameter a, in the error response table 271. That is, it sets the report enable flag to 1; sets the sound type to parameter n; sets the number of emissions to parameter c, sets the emission interval to parameter t, and sets the priority level to parameter b (S622). Control then returns to step S601.

If step S603 detects a stop sound command in the data, the procedure loops back immediately to step S601. This is because the stop sound command is a real-time command, and the stop sound process is run during the receive interrupt process as more fully described below.

If some other type of data is received (S603 returns Other), the corresponding process is run (step S641), and the procedure loops back to step S601.

Offline Interrupt Process

The offline interrupt process is started when an interrupt is asserted to the CPU 201 under circumstances such as described below. It is therefore possible for an offline interrupt to be asserted during the normal control process.

Cover open sensor 251 reports that printer cover 250 is open

No-paper sensor 252 reports there is no paper

Temperature sensor 253 reports an abnormally high temperature in print head 208

Figure 5:
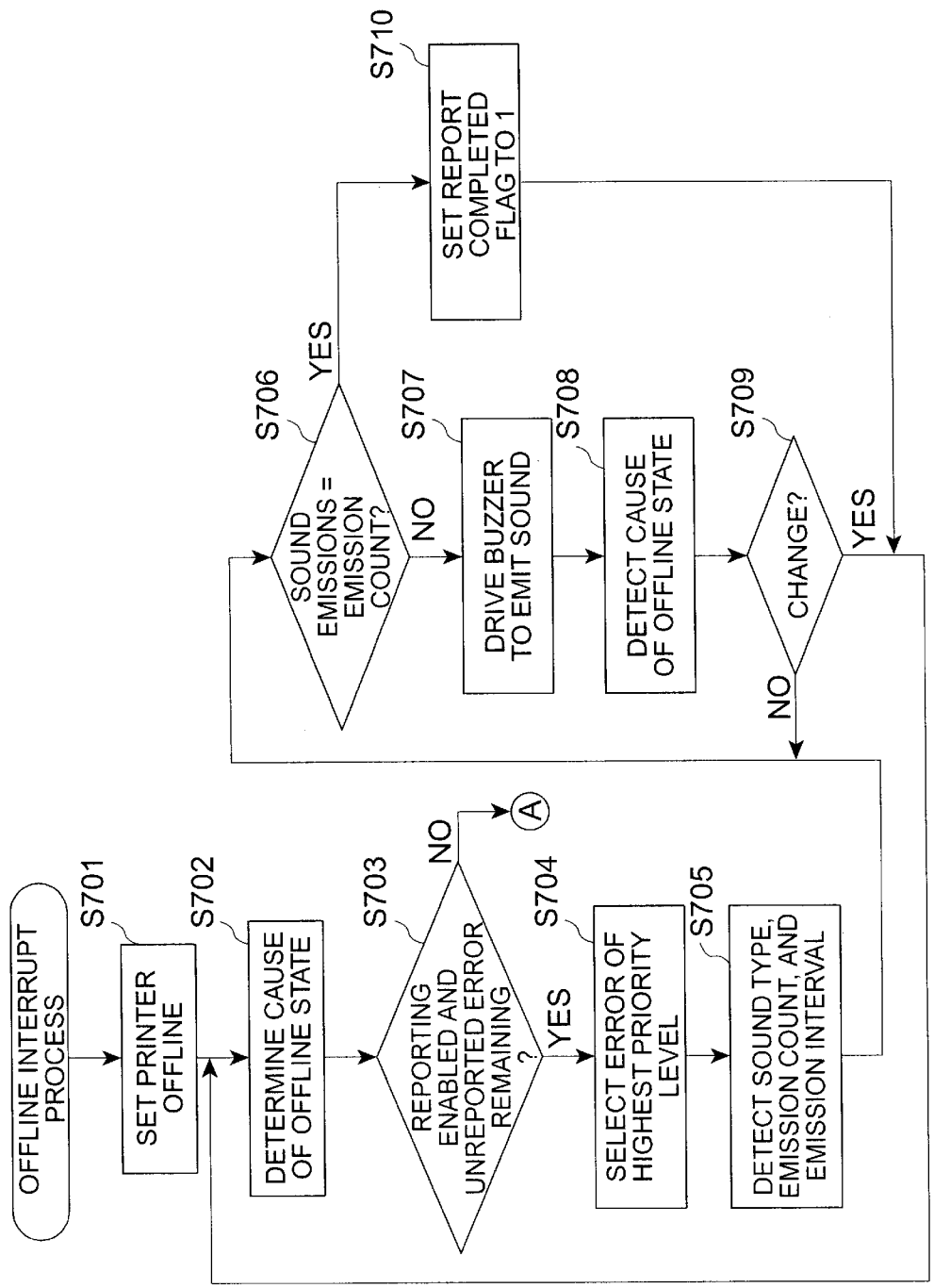
FIG. 5 is a flow chart of the off-line interrupt process run by a printer according to an embodiment of the present invention.
Figure 6:
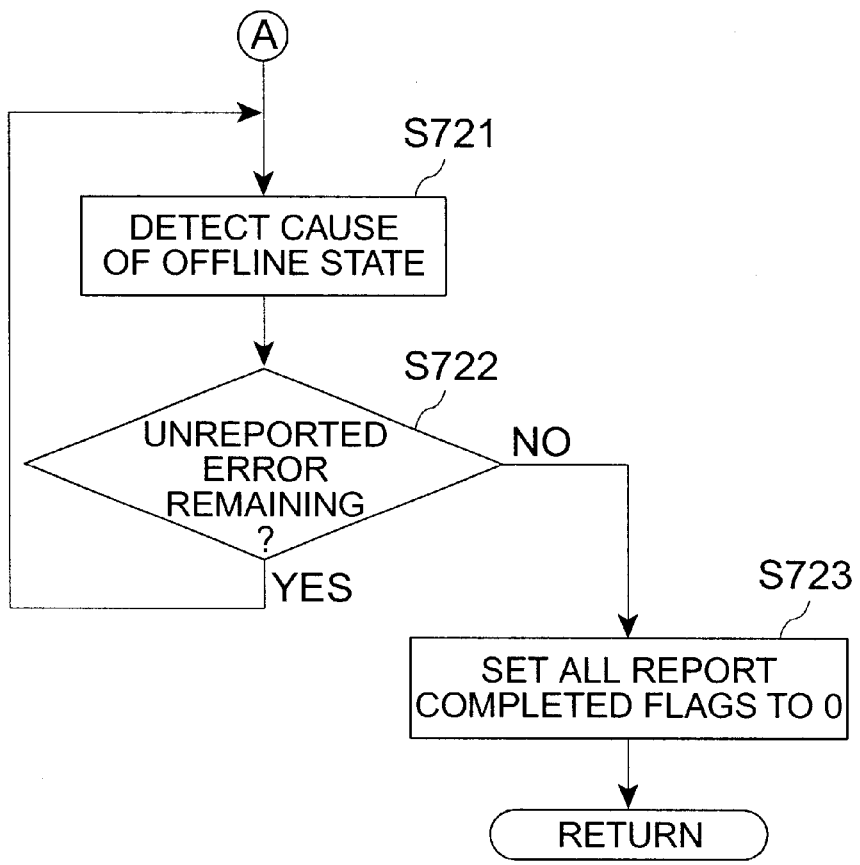
FIG. 6 is a flow chart of subroutine A of the off-line interrupt process shown in FIG. 5.

FIG. 5 and FIG. 6 are flow charts of the control in the offline interrupt process, which is described next below.

First, CPU 201 takes printer 103 offline (S701). This process includes, for example, steps for reporting the printer status to the host by way of interface 203 using an Auto Status Back (ASB) function, and steps for turning on or flashing an LED. It should be noted that a receive interrupt can be asserted even when the printer is offline. Furthermore, an ASB function enables the printer to automatically send specific status information to the host when certain conditions (a particular change in printer status) predefined by the host are met.

CPU 201 then reads status sensors such as the cover open sensor 251, no-paper sensor 252, and temperature sensor 253 to determine the source of the interrupt (S702). Note that plural errors can occur at the same time.

Next, CPU 201 searches the error response table 271 to find whether, for the currently detected error type (if multiple error types occur at the same time: for which of the detected error types), the report enable flag is set to 1 and the report completed flag is set to 0 (S703).

If a matching error type is detected (S703 returns Yes), the error type with the highest priority (if more than one error types are detected) is found (S704), and the settings for sound type, emission number, and emission interval for that error type are read (S705). Steps S706 to S710 are then accomplished while the report completed flag is set to 0 and at most until the sound has been emitted the number of times specified by the setting of emission number.

That is, CPU 201 detects if the buzzer has sounded a number of times equal to the setting of emission number (S706). If not (S706 returns No), the specified type of sound is emitted from buzzer 231 (S707). Each of the error sensors is then read again (S708) to detect if there was a change in the error status (S709). If there was a change (S709 returns Yes), the procedure loops back to S702. If not (S709 returns No), the procedure loops back to S706.

These steps are then repeated until the buzzer has sounded the specified number of emissions (S706 returns Yes). In this case, the report completed flag for the corresponding error type is set to 1 (S710), and the procedure loops back to S702.

On the other hand, if an error to be reported has not been found (S703 returns No), CPU 201 reads the error sensors (S721) and detects whether there remains an error to report (S722). If there is (S722 returns Yes), the procedure loops back to S721, and the offline interrupt process continues.

If no error is detected (S722 returns No), the report completed flag for each of the records in error response table 271 is reset to 0 (S723), and this process ends.

It is therefore possible for a printer according to the present invention to acoustically report an error by emitting sound, and for the user to identify the type of error based on the type of sound emitted.

Furthermore, the user can easily identify which printer is reporting to be offline when plural printers are present by making the types of sound used to report an error different among the various printers.

Moreover, if both a visual reporting means such as an LED and an acoustic reporting means such as a buzzer are used as the error reporting means, either or both means can be selected to report errors depending upon the operating environment of the printer. It is also possible in this case to correlate the flashing or on status of the LED, for example, with the number of and interval between sound emissions. Yet further, if LEDs of different colors are used, a particular sound type can also correlate to a particular LED color.

Furthermore, by assigning a priority level to each error type, an error type with the greatest urgency can be reported with priority over other error types when plural error types occur simultaneously. Yet further, this priority level can be set according to individual user requirements. When the error type with the highest priority level has been resolved, it is also possible to report the error type with the next-highest priority level. In other words, even if one of plural error types has been resolved, if another error type remains unresolved, it can be acoustically reported to the user according to the settings for that error type.

Furthermore, even if the printer can only emit a single sound, it is still possible to use different settings for emission number for different errors, and thereby still acoustically distinguish different error types.

Processing a Stop Sound Command in the Receive Interrupt Process

Real-time commands are processed even when the printer is offline. When a stop sound command is received while the printer is offline, the report completed flag in each record in the error response table 271 is set to 1, and control then returns from the receive interrupt process. That is, emission of sound is stopped until a new error occurs.

When the user notices that the printer is offline and starts to correct the cause of the offline status, by using the stop sound command the host 102 can stop the buzzer 231 and the user can correct the problem without listening to an irritating buzzer.

As described above, the present invention enables a user to select or deselect, separately for each error, an acoustic report. The acoustic report may be in addition to or instead of a visual report. In a preferred embodiment the user can even select, separately for each error, a respective sound pattern to account for the operating environment, and, more particularly, the sound conditions of the surrounding in which the printer is used so that the acoustic report can be easily heard and recognized. Furthermore, a priority level can be assigned to particular errors as required or desired by the user.

It is therefore possible according to the present invention to provide a printer that can use sound to desirably report various printer error conditions to a user. It is furthermore possible to provide a control method for this printer, and a data storage medium storing a computer-readable program embodying this control method.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A printer adapted to be connected to a host device and to operate according to data received from the host device, the printer comprising:

a printing unit;

a sound generator for producing sound;

a detector for detecting whether the printer is in an error state;

a memory for storing, for each error state, respective acoustic report information including an adjustable enable/disable information setting indicative of whether or not said respective error state is to be reported using said sound generator; and a controller, responsive to said detector detecting an error state, for reading the enable/disable information setting for the detected error state in said memory, and for driving said sound generator to emit sound if the enable/disable information setting indicates that the detected error state is to be reported using said sound generator.

2. The printer as described in claim 1, wherein:

said acoustic report information further includes sound information; and the controller is adapted to respond to said detector detecting an error state by also reading the sound information for the detected error state from said memory, and adapted to drive said sound generator in accordance with that sound information if the enable/disable information setting indicates that the detected error state is to be reported using said sound generator;

said sound information including at least one of sound type information, a sound emission number, a sound emission time, and the sound volume, wherein said sound emission number indicates the number of times a sound is to be emitted and said sound emission time indicates the interval between two successive sound emissions.

3. A printer adapted to be connected to a host device and to operate according to data received from the host device, the printer comprising:

a printing unit;

a sound generator for producing sound;

a detector for detecting whether the printer is in an error state;

a memory for storing, for each error state, respective acoustic report information including a priority level and including an adjustable enable/disable information setting indicative of whether or not said respective error state is to be reported using said sound generator; and a controller, responsive to said detector detecting an error state, for reading the enable/disable information setting for the detected error state in said memory, and for driving said sound generator to emit sound if the enable/disable information setting indicates that the detected error state is to be reported using said sound generator;

wherein the controller is adapted to respond to said detector detecting multiple error states by identifying the highest priority sound-requiring error state, defined as the detected error state that has the highest priority level among those error states for which said enable/disable information setting indicates that the error state is to be reported by using said sound generator, and adapted to drive said sound generator in accordance with the sound information stored for the identified highest priority sound-requiring error state.

4. The printer as described in claim 1, further comprising a setting unit for changing said acoustic report information in said memory for a respective error state.

5. The printer as described in claim 4, wherein said setting unit is responsive to a predetermined first command from the host device for changing said acoustic report information in accordance with the command.

6. The printer as described in claim 1, wherein the controller is also responsive to a predetermined second command from the host device for driving said sound generator to emit sound.

7. The printer as described in claim 1, wherein the controller is also responsive to a predetermined third command from the host device to stop driving said sound generator.

8. A method of controlling a printer that is connected to receive, and operates according to, data from a host device, the method comprising:

(a) detecting whether the printer is in an error state;

(b) when an error state is detected in step (a), looking up a table stored in a memory of the printer to find the current setting of an adjustable enable/disable information setting for the error state detected in step (a), said table including, for each error state, respective acoustic report information that includes said enable/disable information setting, which indicates whether or not the respective error state is to be reported using sound; and (c) emitting sound, when an error state is detected in step (a) and step (b) reveals that, for the detected error state, said enable/disable information setting indicates that the error state is to be reported using sound.

9. The method as described in claim 8, wherein:

said acoustic report information further includes sound information; and step (c) includes reading the sound information for the detected error state from said table and emitting said sound in accordance with the read sound information if the enable/disable information setting indicates that the detected error state is to be reported using sound;

said sound information including one of sound type information, a sound emission number, a sound emission time, and the sound volume, wherein said sound emission number indicates the number of times a sound is to be emitted and said sound emission time indicates the interval between two successive sound emissions.

10. A method of controlling a printer that is connected to receive, and operates according to, data from a host device, the method comprising:

(a) detecting whether the printer is in an error state;

(b) when an error state is detected in step (a), looking up a table stored in a memory of the printer to find the current setting of an adjustable enable/disable information setting for the error state detected in step (a), said table including, for each error state, respective acoustic report information that includes a priority level and includes said enable/disable information setting, which indicates whether or not the respective error state is to be reported using sound; and (c) emitting sound, when an error state is detected in step (a) and step (U) reveals that, for the detected error state, said enable/disable information setting indicates that the error state is to be reported using sound;

wherein step (c) further includes identifying the highest priority sound-requiring error state, defined as the detected error state that has the highest priority level among those error states for which said enable/disable information setting indicates that the error state is to be reported using sound, and emitting said sound in accordance with the sound information read for the identified highest priority sound-requiring error state.

11. The method as described in claim 8, further comprising (d) detecting a predetermined first command among data from the host device;

(e) detecting a first command parameter of said first command, said first parameter designating one said error state;

(f) detecting one or more further command parameters of said first command; and (g) writing acoustic report information into said table, for the error state designated by the first command parameter detected in step (e) of a first command detected in step (d), in accordance with said one or more further command parameters detected in step (f) of the first command detected in step (d).

12. The method as described in claim 8, further comprising:
 (h) detecting a predetermined second command among data from the host device, and emitting sound when the second command is detected.

13. The method as described in claim 8, further comprising
 (i) detecting a predetermined third command among data from the host device, and stopping sound emission when the third command is detected.

14. A data storage medium readable by a machine, said data storage medium having a control method for controlling a printer stored as program instructions executable by said machine, said control method comprising:
 (a) detecting whether the printer is in an error state;
 (b) when an error state is detected in step (a), looking up a table stored in a memory of the printer to find the current setting of an adjustable enable/disable information setting for the error state detected in step (a), said table including, for each error state, respective acoustic report information that includes said enable/disable information setting, which indicates whether or not the respective error state is to be reported using sound; and
 (c) emitting sound, when an error state is detected in step (a) and step (b) reveals that, for the detected error state, said enable/disable information setting indicates that the error state is to be reported using sound.

15. The data storage medium as described in claim 14, wherein:
 said acoustic report information further includes sound information; and
 step (c) includes reading the sound information for the detected error state from said table and emitting said sound in accordance with the read sound information if the enable/disable information setting indicates that the detected error state is to be reported using sound;
 said sound information including one of sound type information, a sound emission number, a sound emission time, and the sound volume, wherein said sound emission number indicates the number of times a sound is to be emitted and said sound emission time indicates the interval between two successive sound emissions.

16. A data storage medium readable by a machine, said data storage medium having a control method for controlling a printer stored as program instructions executable by said machine, said control method comprising:
 (a) detecting whether the printer is in an error state;
 (b) when an error state is detected in step (a), looking up a table stored in a memory of the printer to find the current setting of an adjustable enable/disable information setting for the error state detected in step (a), said table including, for each error state, respective acoustic report information that includes a priority level said enable/disable information setting, which indicates whether or not the respective error state is to be reported using sound; and
 (c) emitting sound, when an error state is detected in step (a) and step (b) reveals that, for the detected error state, said enable/disable information setting indicates that the error state is to be reported using sound;
 wherein step (c) further includes identifying the highest priority sound-requiring error state, defined as the detected error state that has the highest priority level among those error states for which said enable/disable information setting indicates that the error state is to be reported using sound, and emitting said sound in accordance with the sound information read for the identified highest priority sound-requiring error state.

17. The data storage medium as described in claim 14, further comprising
 (d) detecting a predetermined first command among data from the host device;
 (e) detecting a first command parameter of said first command, said first parameter designating one said error state;
 (f) detecting one or more further command parameters of said first command; and
 (g) writing acoustic report information into said table, for the error state designated by the first command parameter detected in step (e) of a first command detected in step (d), in accordance with said one or more further command parameters detected in step (f) of the first command detected in step (d).

18. The data storage medium as described in claim 14, further comprising:
 (h) detecting a predetermined second command among data from the host device, and emitting sound when the second command is detected.

19. The data storage medium as described in claim 14, further comprising:
 (i) detecting a predetermined third command among data from the host device, and stopping sound emission when the third command is detected.

20. The data storage medium as described in claim 14, wherein the data storage medium is one of a compact disc, a floppy disk, a hard disk, a magneto-optical disk, a digital video disk, a magnetic tape, and a semiconductor memory.

* * * * *